(12) United States Patent
Raizen

(10) Patent No.: US 10,589,217 B2
(45) Date of Patent: Mar. 17, 2020

(54) WATER RECLAMATION USING GRAPHENE OXIDE FILMS

(71) Applicant: Board of Regents, The University of Texas System, Austin, TX (US)

(72) Inventor: Mark Raizen, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 194 days.

(21) Appl. No.: 15/549,634

(22) PCT Filed: Feb. 8, 2016

(86) PCT No.: PCT/US2016/017023
§ 371 (c)(1),
(2) Date: Aug. 8, 2017

(87) PCT Pub. No.: WO2016/130486
PCT Pub. Date: Aug. 18, 2016

(65) Prior Publication Data
US 2018/0043297 A1 Feb. 15, 2018

Related U.S. Application Data

(60) Provisional application No. 62/113,732, filed on Feb. 9, 2015.

(51) Int. Cl.
*B01D 5/00* (2006.01)
*B01D 53/22* (2006.01)
(Continued)

(52) U.S. Cl.
CPC ......... *B01D 53/228* (2013.01); *B01D 5/0003* (2013.01); *B01D 5/009* (2013.01);
(Continued)

(58) Field of Classification Search
CPC ...... B01D 2258/0266; B01D 2311/103; B01D 2313/23; B01D 53/228; B01D 53/268;
(Continued)

(56) References Cited

U.S. PATENT DOCUMENTS 9,358,508 B2 * 6/2016 Wood .................... B01D 71/06
2013/0318790 A1 12/2013 Becze et al.
2014/0318373 A1 10/2014 Wood et al.

FOREIGN PATENT DOCUMENTS

JP 2004-316398 A 11/2004
WO 2014/126996 A1 8/2014

OTHER PUBLICATIONS

International Search Report and Written Opinion of PCT/US2016/017023 dated Apr. 15, 2016, all pages.
(Continued)

*Primary Examiner* — Sharon Pregler
(74) *Attorney, Agent, or Firm* — Kilpatrick Townsend & Stockton LLP

(57) ABSTRACT

Systems, devices, and methods are described herein for generating liquid water from water vapor present in the atmosphere through use of selectively permeable films that permit water to pass through but that block other liquids and gases, such as atmospheric gases. The systems, devices, and methods employ condensation techniques in which only the water that is passed through the selectively permeable film is cooled, as compared to other atmospheric water generation systems, which cool water and other gases that enter with the water.

20 Claims, 11 Drawing Sheets

(51) Int. Cl.
    *C02F 1/00*     (2006.01)
    *C02F 1/32*     (2006.01)
    *E03B 3/28*     (2006.01)
    *B01D 53/26*     (2006.01)
    *B01D 67/00*     (2006.01)
    *B01D 71/02*     (2006.01)
    *C02F 1/78*     (2006.01)

(52) U.S. Cl.
    CPC ......... *B01D 5/0072* (2013.01); *B01D 53/265* (2013.01); *B01D 53/268* (2013.01); *B01D 67/0069* (2013.01); *B01D 71/024* (2013.01); *C02F 1/001* (2013.01); *C02F 1/32* (2013.01); *E03B 3/28* (2013.01); *C02F 1/78* (2013.01); *C02F 2303/04* (2013.01)

(58) Field of Classification Search
    CPC .... B01D 63/06; B01D 71/021; B01D 71/024; B01D 71/06
    See application file for complete search history.

(56) References Cited

OTHER PUBLICATIONS

Nair, et al., "Unimpeded Permeation of Water Through Helium-Leak-Tight Graphene-Based Membranes", Science, vol. 335, pp. 442-444 and Supporting Online Material, Jan. 27, 2012, all pages.

\* cited by examiner

WATER RECLAMATION USING GRAPHENE OXIDE FILMS

CROSS-REFERENCE TO RELATED APPLICATIONS

This application is a U.S. National Stage of PCT International Application No. PCT/US2016/017023, filed on Feb. 8, 2016, entitled "Water Reclamation Using Graphene Oxide Films," which claims the benefit of and priority to U.S. Provisional Application 62/113,732, filed on Feb. 9, 2015, the disclosures of which are hereby incorporated by reference in their entireties for all purposes.

BACKGROUND

The following disclosure relates, in general, to atmospheric water reclamation systems, and, more particularly, to systems for reclaiming water from the air utilizing graphene oxide (GO).

Water reclamation systems utilize some type of mass that has a temperature lowered below the ambient atmospheric temperature. The water vapor in the air is passed over the surface of this mass to allow the water vapor to condense. This condensation is then collected as water. This area of technology is generally referred to as Atmospheric Water Generation (AWG). This type of condensation of water vapor on cold surfaces is fairly inefficient.

It is important to recognize two fundamental energy costs in current AWG. The first is the latent heat of condensation when water vapor turns into liquid. The released heat is significant, about 2500 Joules per gram of water, and must be removed by the cooling system. However, in addition to condensing water, currently available AWG systems cool all the air that passes through. This cost and energy is like running an air conditioner outside.

SUMMARY

Systems, methods, and devices are provided herein for obtaining liquid water from the atmosphere. The disclosed systems, methods, and devices, may employ cooling components to reduce a temperature of water vapor to a level at which the water vapor condenses to form liquid water, which may be optionally purified for consumption. The disclosed systems, methods, and devices advantageously employ selectively permeable materials that are permeable to water but impermeable to atmospheric gases, like $O_2$, $N_2$, and Ar, and allow for atmospheric water generation by cooling only trapped water instead of both trapped water and trapped atmospheric gases. Substantial energy savings may be achieved through use of the selectively permeable materials as compared to systems that generate water from the atmosphere but do not employ selectively permeable materials.

In an aspect, systems for atmospheric water reclamation are provided. In an embodiment, a system of this aspect may comprise an enclosure defining an internal volume, such as an enclosure that prevents gases from permeating into or out of the internal volume, where at least a portion of the enclosure is a liquid water permeable region that allows water molecules to permeate into or out of the internal volume; a heat transfer surface positioned within the internal volume, such as a heat transfer surface that is configured to remove heat from within the internal volume such that water vapor present within the internal volume condenses on the heat transfer surface to form condensed liquid water; and a reservoir positioned within the internal volume to collect the condensed liquid water.

The liquid water permeable region may comprise a thin film or coating over a permeable material. Optionally, the liquid water permeable region comprises a thin film having a thickness between 0.1 μm and 5 μm. For example, the liquid water permeable region may comprise graphene oxide, such as a graphene oxide film. Optionally, the liquid water permeable region comprises an interlocking layer structure comprising a graphene oxide laminate including a plurality of graphene oxide crystallites. Useful liquid water permeable regions include those formed by steps including dispersing graphite oxide in water by sonication to form a stable suspension of graphene oxide crystallites; spray-coating or spin-coating the stable suspension of graphene oxide crystallites over a supporting film; and removing at least a portion of the supporting film. Optionally, a system of this aspect may further comprise a support structure attached to the enclosure for supporting the liquid water permeable region, such as a support matrix, a frame structure, a rib structure, etc.

Optionally, the liquid water permeable region comprises an interlocking layer structure including a system of nano-capillaries. For example, liquid water may pass from a first surface of the interlocking layer structure to a second surface of the interlocking layer structure through the system of nano-capillaries. Additionally, gases, such as $O_2$, $N_2$, and Ar, are incapable of passing through the system of nano-capillaries. For example, nano-capillaries may have a dimension selected between 5 Å and 15 Å, and may, in embodiments, allow a layer of liquid water to form within the nano-capillary such that liquid water can flow from one surface to another surface, and the presence of the water may block gases from passing through the nano-capillary. Optionally, the liquid water permeable region allows water molecules to permeate into the internal volume by water molecules, in vapor form present in an atmosphere external to the enclosure, condensing on the first surface of the interlocking layer structure and changing to liquid form, passing as a liquid through the system of nano-capillaries, and evaporating from the second surface of the interlocking layer structure to increase a partial pressure of water within the internal volume.

It will be appreciated that any material may exhibit some amount of permeability to gases or liquids and so no material may be perfectly impermeable. As used herein, a material may be referred to as permeable to a substance, such as a liquid or a gas, if it exhibits permeation rate greater than or equal to $10^{-5}$ mm·g/cm²·s·bar, greater than or equal to $10^{-4}$ mm·g/cm²·s·bar, greater than or equal to $10^{-3}$ mm·g/cm²·s·bar, greater than or equal to $10^{-2}$ mm·g/cm²·s·bar, or greater than or equal to $10^{-1}$ mm·g/cm²·s·bar. As used herein, a material may be referred to as impermeable or not permeable to a substance, such as a liquid or a gas, if it exhibits permeation rate less than or equal to $10^{-6}$ mm·g/cm²·s·bar, less than or equal to $10^{-7}$ mm·g/cm²·s·bar, less than or equal to $10^{-8}$ mm·g/cm²·s·bar, less than or equal to $10^{-9}$ mm·g/cm²·s·bar, or less than or equal to $10^{-10}$ mm·g/cm²·s·bar.

A variety of heat transfer surfaces and configurations are useful with the systems, devices, and methods described herein, and may be used to remove heat from within the internal volume of an enclosure to allow water vapor to condense and form liquid water. For example, the heat transfer surface may comprise a condensing surface that has a temperature below ambient temperature. Optionally, the heat transfer surface comprises an internal surface of the enclosure. Optionally, the heat transfer surface comprises a surface of a heat exchanger that is positioned in thermal communication with a heat pump or refrigeration system.

A variety of materials are useful for the enclosures of the systems and devices described herein. For example, in embodiments, the enclosure comprises one or more materials selected from the group consisting of plastic, metal, glass, polymer, Teflon, Kapton, and any combination of these. It will be appreciated that the systems and methods described herein are particularly advantageous when the enclosure is impermeable or substantially impermeable to gases. For example, in one embodiment, the enclosure exhibits a gas permeation rate less than or equal to $10^{-8}$ mm·g/cm$^2$·s·bar. Advantages may be obtained by use of gas impermeable enclosures in that, in order to remove heat from and condense water vapor present in the internal volume of the enclosure, additional heat does not need to be removed from other gases that may be brought into the enclosure with water vapor because these other gases are actually not brought into the enclosure, due to its gas impermeable nature.

It will be appreciated that additional components may be included in the systems and devices disclosed herein. Such additional components may advantageously increase the efficiency of water generation, but may not be strictly necessary for device operation. For example, a system of this aspect may further comprise a fan or blower for directing air from an atmosphere external to the enclosure towards the liquid water permeable region. Optionally, a system of this aspect may further comprise a fan or blower within the internal volume for circulating gases within the internal volume over an internal surface of the liquid water permeable region. Optionally, a system of this aspect may further comprise a fan or blower within the internal volume for circulating gases within the internal volume over the heat transfer surface. Optionally, a system of this aspect may further comprise a pump within the internal volume for pumping liquid water out of the reservoir.

In embodiments, the enclosure comprises a balloon. In a balloon configuration, the heat transfer surface may correspond to an inner surface of the balloon, for example. In a balloon configuration, the water reservoir corresponds to a bottom portion of the balloon, for example.

Optionally, the enclosure comprises a first balloon including a first lifting gas within the internal volume. Optionally, a system of this aspect further comprises a second balloon comprising a second enclosure defining a second internal volume including a second lifting gas, such as a second enclosure that prevents gas from permeating into or out of the second internal volume, and where at least a portion of the second enclosure is a second liquid water permeable region that allows water molecules to permeate into or out of the second internal volume; a second heat transfer surface positioned within the second internal volume, such as a second heat transfer surface that is configured to remove heat from within the second internal volume such that water vapor present within the second internal volume condenses on the second heat transfer surface to form condensed liquid water; and a second reservoir positioned within the second internal volume to collect condensed liquid water. Optionally, a system of this aspect further comprises a pulley system configured for raising the first balloon while lowering the second balloon and for lowering the first balloon while raising the second balloon, such that the first balloon and the second balloon are each attached to the pulley system; and a motor attached to the pulley system for raising and lowering the first balloon and the second balloon.

In another aspect, provided are atmospheric water reclamation devices. In an embodiment, a device of this aspect comprises a membrane, such as where at least a portion of the membrane is a liquid water permeable region, where the membrane prevents gases from permeating into or out of an internal volume surrounded by the membrane, and where the liquid water permeable region allow water molecules to permeate into or out of the internal volume. Optionally, a device of this aspect further comprises a lifting gas trapped within the membrane. Optionally, the membrane comprises one or more materials selected from the group consisting of Mylar, latex, polychloroprene, nylon, and any combination of these.

Optionally, the liquid water permeable region comprises an interlocking layer structure including a system of nano-capillaries, such as where liquid water is permitted to pass from a first surface of the interlocking layer structure to a second surface of the interlocking layer structure through the system of nano-capillaries, and where gases are incapable of passing through the system of nano-capillaries.

Optionally, the liquid water permeable region comprises a graphene oxide film exemplary embodiments, the interlocking layer structure comprises a graphene oxide laminate including a plurality of graphene oxide crystallites. Optionally, the liquid water permeable region is formed by steps including: dispersing graphite oxide in water by sonication to form a stable suspension of graphene oxide crystallites; spray-coating or spin-coating the stable suspension of graphene oxide crystallites over a supporting film; and removing at least a portion of the supporting film, thereby generating the liquid water permeable region.

It will be appreciated that an internal surface of devices of this aspect may function as a heat transfer surface. For example, an internal surface of the membrane may be a heat transfer surface for removing heat from within the internal volume such that water vapor present in gases within the internal volume condenses on the internal surface to form condensed liquid water. In embodiments, heat may pass through the wall of the enclosure from the internal surface to the external surface and be carried away by a gas or liquid in contact with the external surface, such as through conductive or convective processes.

Additional components may be included in various device embodiments of this aspect. For example, a device of this aspect may optionally further comprise a structural film positioned adjacent to all or a portion of the liquid water permeable region. For example, the liquid water permeable region may comprise a coating positioned adjacent to the structural film. Useful structural films include those permeable to water, those permeable to gases, and those permeable to both gases and water.

Also provided herein are methods. For example, in another aspect, methods for atmospheric water reclamation are provided. In a specific embodiment, a method of this aspect comprises providing an enclosure surrounding an internal volume, such as an enclosure that prevents gases from permeating into or out of the internal volume, and where at least a portion of the enclosure is a liquid water permeable region that allows water molecules to permeate into or out of the internal volume; cooling a heat transfer surface positioned within the internal volume to remove heat from gases within the internal volume such that water vapor present in the gases within the internal volume condenses on the heat transfer surface to form condensed liquid water; and collecting the condensed liquid water in a reservoir within the internal volume.

Optionally, the liquid water permeable region comprises a graphene oxide film. Optionally, the liquid water permeable region comprises an interlocking layer structure including a system of nano-capillaries, such as where liquid water is permitted to pass from a first surface of the interlocking layer structure to a second surface of the interlocking layer structure through the system of nano-capillaries, and where gases are incapable of passing through the system of nano-capillaries. Optionally, the interlocking layer structure comprises a graphene oxide laminate including a plurality of graphene oxide crystallites. Useful liquid water permeable regions include those formed by steps including dispersing graphite oxide in water by sonication to form a stable suspension of graphene oxide crystallites; spray-coating or spin-coating the stable suspension of graphene oxide crystallites over a supporting film; and removing at least a portion of the supporting film, thereby generating the liquid water permeable region.

Optionally, the enclosure comprises a balloon filled with a lifting gas. Optionally, the heat transfer surface comprises an internal surface of the balloon. Optionally, cooling the heat transfer surface includes increasing an elevation of the balloon from a first altitude having a first atmospheric temperature to a second altitude having a second atmospheric temperature that is lower than the first atmospheric temperature.

In another aspect, methods for making an apparatus for atmospheric water reclamation are provided. A specific method embodiment of this aspect comprises providing an enclosure for surrounding an internal volume; and creating a liquid water permeable region within a wall of the enclosure, wherein the liquid water permeable region allows water molecules to permeate into or out of the internal volume, wherein the enclosure and the liquid water permeable region together prevents gas molecules and gas atoms from permeating into or out of the internal volume. In embodiments, the enclosure includes a supporting structure for supporting the liquid water permeable region.

A method of this aspect may optionally further comprise providing a heat transfer surface within the internal volume, wherein the heat transfer surface is configured to remove heat from within the internal volume such that water vapor present in gases within the internal volume condenses on the heat transfer surface to form condensed liquid water. A method of this aspect may optionally further comprise providing a reservoir within the internal volume for collecting the condensed liquid water.

Useful liquid water permeable regions include those comprising graphene oxide, such as a graphene oxide film. Useful liquid water permeable regions include those comprising an interlocking layer structure including a system of nano-capillaries, such as where liquid water is permitted to pass from a first surface of the interlocking layer structure to a second surface of the interlocking layer structure through the system of nano-capillaries, and where gases are incapable of passing through the system of nano-capillaries. Optionally, the interlocking layer structure comprises a graphene oxide laminate including a plurality of graphene oxide crystallites. Optionally, creating the liquid water permeable region includes forming a graphene oxide film by: dispersing graphite oxide in water by sonication to form a stable suspension of graphene oxide crystallites; spray-coating or spin-coating the stable suspension of graphene oxide crystallites over a supporting film; and removing at least a portion of the supporting film.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

The present disclosure is described in conjunction with the appended figures in which.

DETAILED DESCRIPTION

Figure 1:
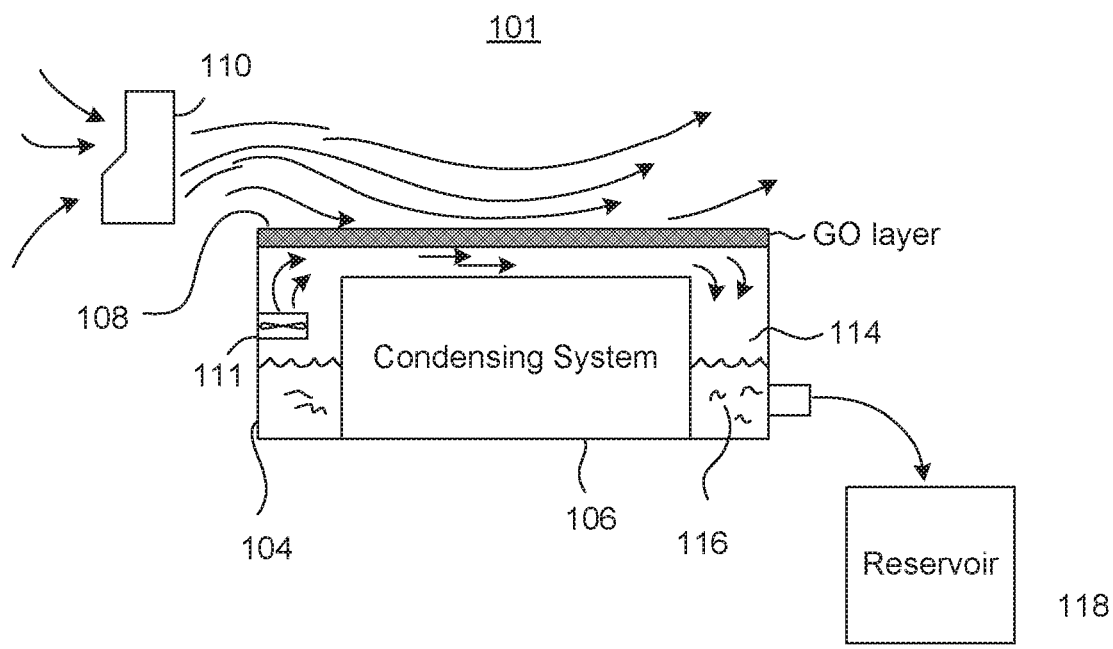
FIG. 1 illustrates a generalized system depicting a graphene oxide layer disposed over a condensing system to isolate the external water vapor in the external atmosphere.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, etc.

In general the terms and phrases used herein have their art-recognized meaning, which can be found by reference to standard texts, journal references and contexts known to those skilled in the art. The following definitions are provided to clarify their specific use in the context of the invention.

"Enclosure" refers to a body comprising materials) that define and surround an a spatial region in which other components, equipment, objects, or materials may be placed or collected. An enclosure may surround and define an internal volume corresponding to the spatial region inside of the enclosure and the spatial region may include different materials than the enclosure. An enclosure may comprise multiple different materials that together surround an internal volume. An enclosure may include a sealable opening, such as a door, window, hatch, access panel, valve, etc., that may be used to provide a passage between the internal volume and outside the enclosure. An enclosure may be assembled from multiple panels. An enclosure may comprise, consist of, or consist essentially of a unitary body. An enclosure may comprise, consist of, or consist essentially of a composite body. For example, an enclosure may include a first material and a second material different from the first material. Useful materials for an enclosure include, but are not limited to, plastic, metal, glass, polymer, graphene oxide, Mylar, rubber, and combinations of these and other materials. Useful materials for an enclosure may also include materials that are not permeable or are not substantially permeable to gases, such as $O_2$, $CO_2$, $N_2$, He, $H_2$, Ar, etc. Useful materials for an enclosure may also include materials that are permeable to liquid water, such as those described herein as useful for a liquid water permeable region.

"Internal volume" refers to a spatial region surrounded by another object or body, such as a composite body or a unitary body that may form an enclosure. An internal volume may accommodate or include other objects or materials within the spatial region defined as the internal volume. An internal volume may correspond to that spatial region within an enclosure that includes materials different from those that the enclosure may be made of. For example, an enclosure may comprise a container, such as a box, case, or balloon, that may include a gas filled spatial region surrounded by the walls of the container. Optionally, other objects or equipment, such as heat transfer surfaces, gas flow devices, liquid flow devices, fluid reservoirs, etc., may be positioned within an internal volume. Optionally, materials in addition to gas may be placed or collected within an internal volume, such as liquid water.

"Liquid water permeable region" refers to a portion of an object, body, or enclosure that permits water, such as liquid water, to pass or permeate through but that may prevent gases, such as $O_2$, $CO_2$, $N_2$, He, $H_2$, and other materials from passing or permeating through. A liquid water permeable region may correspond to a film of material embedded, attached, or otherwise integrated into another body, such as a gas and liquid impermeable body, in a way that allows liquid water to pass from one side of the body to the other side of the body by way of the liquid water permeable region. Useful liquid water permeable regions include those constructed from liquid water permeable materials that also are impermeable or substantially impermeable to gases. For example, useful liquid water permeable materials include those materials comprising an interlocking layer structure including a system of nano-capillaries that permit liquid water graphene oxide to pass from a first surface of the interlocking layer structure to a second surface of the interlocking layer structure through the system of nano-capillaries.

The terms "permeate," "permeation," and variations thereof refer to a process by which a liquid or gas passes through a solid material, film, layer, or other body. Permeation may occur when gases or liquids penetrate into and out from a solid body. Depending on the structure and composition of the body, different gases and liquids may permeate more easily into or across the body. For example, a material that is permeable to a gas or liquid exhibits a permeation rate greater than about $10^{-5}$ mm·g/cm²·s·bar, greater than about $10^{-4}$ mm·g/cm²·s·bar, greater than about $10^{-3}$ mm·g/cm²·s·bar, greater than about $10^{-2}$ mm·g/cm²·s·bar, or greater than about $10^{-1}$ mm·g/cm²·s·bar. In other examples, a material that is impermeable (i.e., not permeable) or substantially impermeable to a gas or liquid exhibits a permeation rate less than about $10^{-6}$ mm·g/cm²·s·bar, less than about $10^{-7}$ mm·g/cm²·s·bar, less than about $10^{-8}$ mm·g/cm²·s·bar, less than about $10^{-9}$ mm·g/cm²·s·bar, or less than about $10^{-10}$ mm·g/cm²·s·bar.

"Nano-capillary" refers to a small opening between materials that has a characteristic width dimension on the order of nanometers or less. For example, a nano-capillary may correspond to a spacing between layers of an interlocking layer structure or between crystallites present in a crystalline laminate in which the spacing is between about 5 Å (0.5 nm)

and 15 Å (1.5 nm). Nano-capillaries may exhibit lengths on the order of nm to µm, for example. Optionally, a plurality of nano-capillaries may arrange or align adjacent to, in contact with, or otherwise in gas or liquid communication with one another to form a "system of nano-capillaries," which may provide a continuous path or channel through multiple individual nano-capillary from a first surface of an interlocking layer structure or crystalline laminate to a second surface of the interlocking layer structure or crystalline laminate, such that water may pass or flow through or along the continuous path or channel.

"Graphene oxide" refers to compound formed of carbon, oxygen, and hydrogen in a single layer (two-dimensional) monomolecular sheet having a structure corresponding to graphene in which some, though not necessarily all, carbon atoms of the graphene are covalently bonded to oxygen atoms or hydroxyl groups. It will be appreciated that the term "graphene" generally corresponds to a single layer monomolecular sheet in which the carbon atoms are arranged in a two-dimensional hexagonal lattice structure, similar to a single layer of graphite. A "graphene oxide crystal" or "graphene oxide crystallite" refers to a single crystalline structure formed of graphene oxide, which may exhibit a characteristic length on the order of 0.5 µm to 5 µm, for example. A "graphene oxide laminate" refers to a structure in which multiple individual graphene oxide crystals are arranged to form an interlocking layer structure. A "graphene oxide film" refers to a sheet-like structure composed of many graphene oxide crystallites. Graphene oxide films may, for example, exhibit lateral dimensions of 1 cm or greater and thicknesses of between 0.1 µm and 20 µm, such as a thickness of approximately 1 µm.

"Graphite oxide" refers to a compound formed of carbon, oxygen, and hydrogen in which the carbon atoms are arranged in stacks of two-dimensional hexagonal lattice structures and in which some, though not necessarily all, of the carbon atoms are covalently bound to an oxygen atom or hydroxyl group. Graphite oxide contrasts with graphene oxide in that graphite oxide may be formed of a stack of multiple individual hexagonal lattice structures, while graphene oxide may refer to only a single hexagonal lattice structure. Graphite oxide may be dispersed in a solution by sonication or ultrasonication to form a suspension of graphene oxide crystallites, which may be then spray-coated or spin coated onto a supporting film to form a graphene oxide film.

"Membrane" refers to a flexible barrier that may be arranged as a sheet-like structure and has a characteristic thickness smaller than its lateral dimensions and that may be used to prevent gas or liquid from passing across and thus be retained in a particular volume, defined at least in part by the membrane. A membrane may be constructed to adopt any desired shape, such as an approximately spherical shape, a teardrop shape, etc. A membrane may be useful for forming all or a portion of an enclosure. For example, a balloon may primarily comprise a membrane that, when inflated with a gas or gas mixture, such as a lifting gas, defines an internal volume of the balloon.

"Support structure" refers to an arrangement of materials used for providing rigidity or otherwise supporting a load of another material or object such that a particular shape of the other material or object is retained. For example, a support structure may correspond to one or more one- or two-dimensional elements that may define an overall shape of an object, and that may be used to support or otherwise position other materials of the object. For example, a lattice or mesh structure may be used to support a film, membrane, or web of material, such that the film, membrane, or web of material maintains a substantially constant shape.

"Supporting film" refers to a layer of material that may be placed adjacent to another material to provide structural rigidity to, strength to, or otherwise support the other material. Supporting films may be useful in circumstances where a particular film is delicate and may be subject to ripping, tearing, or other damage due to compression, tension, exposure to pressure, or otherwise handling the particular film. For example, graphene oxide films may be very thin, such as on the order of micrometers, and thus may be at risk for sustaining damage through handling of the graphene oxide; additional rigidity or strength may be provided to the graphene oxide film by positioning it adjacent to or coating it on a supporting film.

"Heat transfer surface" refers to a region of a body or object which is used to transfer energy to or from another material, and thus heat or cool the other material. For example, a heat transfer surface may correspond to a surface of thermoelectric element or a heat sink attached thereto. As another example, a heat transfer surface may correspond to a cooled surface of a refrigeration system. As another example, a heat transfer surface may correspond to an internal surface of a wall of an enclosure, such as to allow heat to pass from within the enclosure to outside of the enclosure.

The systems, devices, and methods described herein are useful for generating liquid water from water vapor present in the atmosphere through use of selectively permeable films that permit water to pass through but that block other liquids and gases. The systems, devices, and methods employ condensation techniques in which only the water that is passed through the selectively permeable film is cooled, as compared to other atmospheric water generation systems, which cool water and other gases that enter with the water. The cooling of additional gases is considered, in embodiments, an inefficient use of energy, as substantial amounts of energy may be expended in reducing a temperature of atmospheric gases that do not contribute to generation of water. In embodiments, the atmospheric water generation systems, devices, and methods of the invention may generate about twice as much water for the same energy expenditure as prior systems.

Referring now to the drawings, wherein like reference numbers are used herein to designate like elements throughout, the various views and embodiments of a water reclamation system utilizing graphene oxide films are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

It will be appreciated by those skilled in the art having the benefit of this disclosure that this water reclamation system utilizing graphene oxide films provides a water permeable barrier between the external environment and a condensing mass, such as a heat transfer surface or a heat transfer or condensing plate. Description of the properties of graphene oxide films as a water permeable barrier may be found in Nair et al., "Unimpeded Permeation of Water Through Helium-Leak-Tight Graphene-Based Membranes," *Science*, 27 Jan. 2012: vol. 335, no, 6067, pp. 442-444, which is hereby incorporated by reference. It should be understood that the drawings and detailed description herein are to be regarded in an illustrative rather than a restrictive manner, and are not intended to be limiting to the particular forms and examples disclosed. On the contrary, any further modifications, changes, rearrangements, substitutions, alternatives, design choices, and embodiments apparent to those of ordinary skill in the art, are included without departing from the spirit and scope hereof, as defined by the following claims. Thus, it is intended that the following claims be interpreted to embrace all such further modifications, changes, rearrangements, substitutions, alternatives, design choices, and embodiments.

FIG. 1 illustrates a diagrammatic view of an embodiment of an Atmospheric Water (AWG) system 101. The AWG system 101 includes a sealed enclosure 104 that includes a condensing system 106. This condensing system 106 includes a cooling plate that can be configured with a plurality of coils through which a refrigerant passes. The upper surface of the sealed enclosure 104 is covered by a layer 108 that is comprised, at least in part, of a liquid water permeable region, such as a layer of graphene oxide (GO), with either side thereof exposed, one to the interior of the enclosure 104 and one to the exterior. This layer 108 provides a one-way wall for water vapor, that does not allow gases in the external environment to permeate through. This layer 108 may comprise, at least in part, a thin GO membrane. A fan 110 or air moving device is provided to pass air over the surface of the layer 108. Nanoscale pores present in layer 108 may transmit water but effectively stop any gas permeation. These nanoscale pores are referred to as nano-capillaries. As will be described hereinbelow, water transmission is substantially unimpeded through these nano-capillaries, as if the layer 108 were not present. As such, water will be transported through layer 108 from the exterior of the sealed enclosure 104 to the internal volume 114 thereof, to increase the vapor pressure of water in internal volume 114. Condensing system 106 then cools gas phase water from the internal volume of sealed enclosure 104 so that it condenses and collects in the bottom thereof as water 116, with sealed enclosure 104 functioning as a reservoir. Water 116 may then be extracted therefrom to an external reservoir 118.

In the operation of the AWG system 101 of FIG. 1, the air passing over the external surface of layer 108 is not cooled by the condensing system 106, and only the water that permeates through the nano-capillaries in the layer 108 may be cooled and condense on the surface of the condensing system 106. It is noted that the fan 110 is optional, and its inclusion may increase the rate of diffusion of water vapor to the surface of the layer 108. Additionally, fan 111 is optional, and its inclusion may increase the rate of diffusion of water vapor from the internal surface of layer 108.

Advantageously, graphene is generally impermeable to all gases and liquids, such that it can act as a barrier. However, films made from graphene oxide, a graphene derivative, may be manufactured as a laminate that may include a collection of micron-sized GO crystallites forming an interlocked layered structure. This interlayered structure may be provided as a membrane or film. One useful method for obtaining graphite oxide is the Hummer method, which may be used to obtain graphite oxide dispersed in water by sonication to make a stable suspension of GO crystallites. This suspension may then be utilized to produce laminates by spray-on or spin-coating. These prepared GO films may exhibit a pronounced layered structure that consists of crystals of a given length (L) of a few micrometers, which are separated by a typical distance (d) of around 10 Å.

Water vapor in a container may permeate through a GO film at substantially the same rate as the water vapor would pass through an open aperture. An increase in humidity on an external side of a GO film may result in an increase of the water permeation rate from the external side to the internal side. In embodiments, surfaces of the GO film may be wetted and the passage of air there over will cause a higher permeation rate of water through the film.

Figure 2:
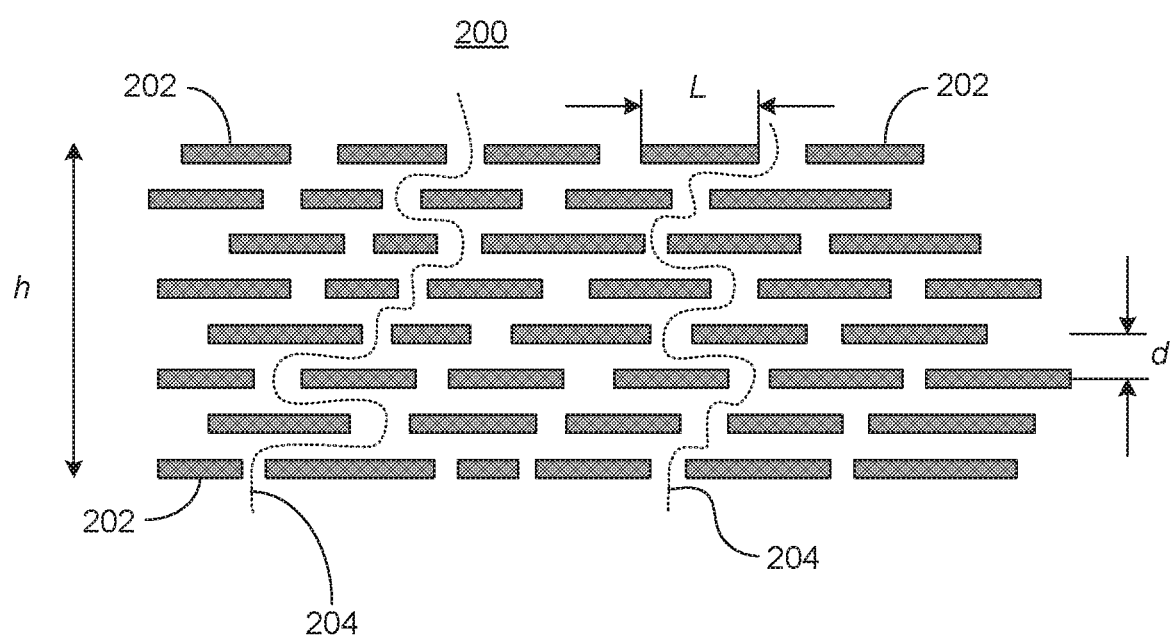
FIG. 2 illustrates a cross-sectional view of a graphene oxide layer with the water capillaries illustrated therein.

FIG. 2 illustrates a schematic view of a GO film composed of an interlocking layer structure 200. This structure comprises a plurality of crystals 202 of average length L disposed in a laminated structure. The overall thickness of the membrane is h and the distance between layers is d. Dotted lines 204 illustrate the transport of water molecules through the structure 200. The paths along which the water molecules are transported are defined by the system of nano-capillaries formed within the laminate. These are filled, in embodiments, with water under ambient conditions. In embodiments, the width of these nano-capillaries may be substantially the width of a water molecule. A capillary-like pressure provides a sufficient flow to keep the external GO surface wetted so that the observed permeability is effectively limited at the surface by evaporation.

In general, graphene may be hydrophobic and the nano-capillaries formed in a graphene laminate may confine the monolayer water in such a manner that it is maintained in its liquid phase. The operation may be such that the nano-capillaries actually draw in water allowing for its rapid permeation. These nano-capillaries are approximately one atom or molecule in width to facilitate transport of monolayer water.

Graphene oxide is optionally synthesized from purified natural graphite utilizing the Hummers method wherein colloidal dispersions of individual graphene oxide sheets in water at the concentration of, for example, 3 mb ml$^{-1}$ can be prepared with the aid of ultrasound. Graphene oxide paper can be thus manufactured by filtration of the resulting colloid through an Anodisc membrane filter (47 mm in diameter, 0.2 μm pore size) followed by air drying and peeling from the filter. The thickness of each graphene oxide paper sample may be controlled by adjusting the volume of the colloidal suspension.

Figure 3:
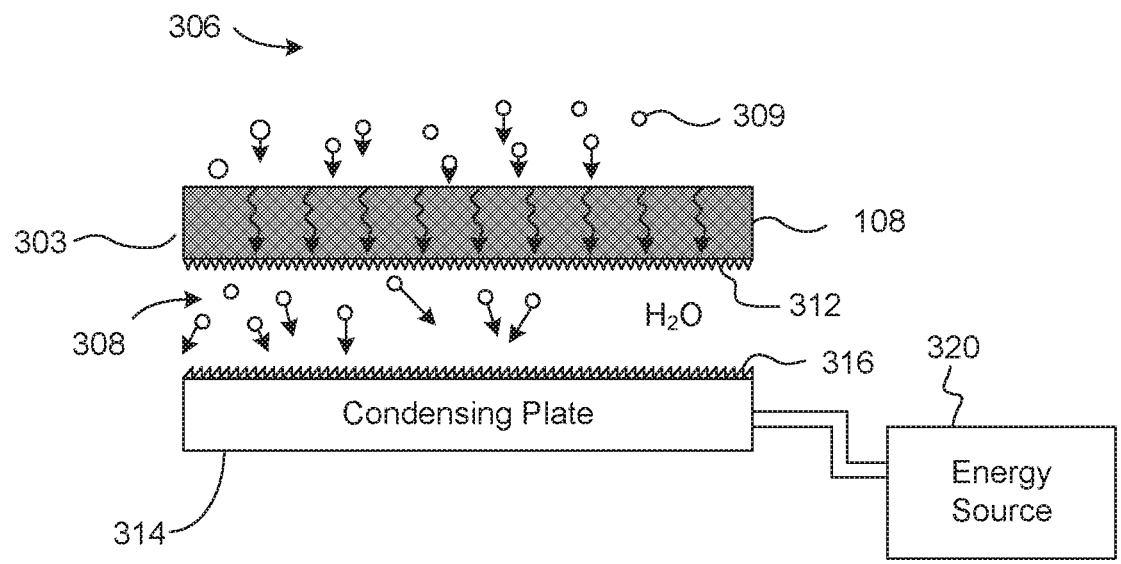
FIG. 3 illustrates a diagrammatic view of the operation of water vapor passing through the graphene oxide layer and condensing on the condensing plate.

FIG. 3, illustrates a schematic side view of the transport and condensation of water vapor through layer 108. Layer 108 includes, for example, a thin GO film 303, such as depicted as structure 200 in FIG. 2. The film 303 functions as a barrier layer that separates an external environment 306 from an internal environment 308. External environment 306 has a vapor pressure associated with water vapor at a particular level that interacts with the external surface of the membrane 303. Water molecules 309 that contact the surface of the membrane 303 are converted to the liquid phase and pass through the nano-capillaries in the film 303. The water reaches the lower surface of the membrane 303 adjacent the internal environment 308 to form a wetted surface 312. Evaporation occurs from wetted surface 312 and, the faster the evaporation, the faster the transport of water through the membrane 303. By passing air over this wetted surface 312, the speed of transport of water through the membrane 303 may be increased. This results in additional water vapor added to the internal environment 308. A heat transfer surface, illustrated here as condensing plate 314, cools the water vapor present in the internal environment 308 where water 316 condenses thereon. The water 316 is then collected. The condensing plate 314 is driven by an energy source 322 in order to cool that surface. Thus, the energy extracted from the internal environment 308, which cools the internal environment 308 and results in water vapor from the internal environment condensing on condensing plate 314, is not transferred to the external environment 306 and thus does not extract energy from the external environment 306, thus not transferring energy to the environment 306 and to the external air.

Figure 4A:
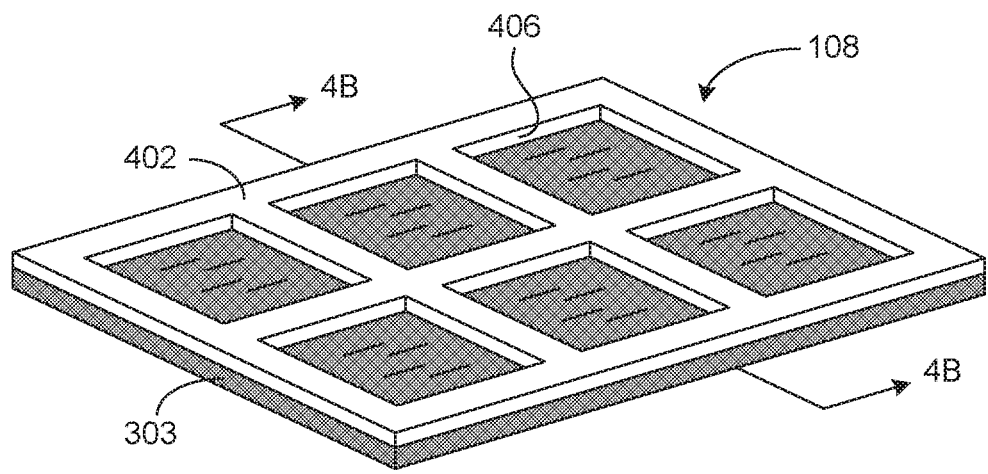
FIG. 4A illustrates a perspective view of a supporting structure for a thin graphene oxide layer.
Figure 4B:
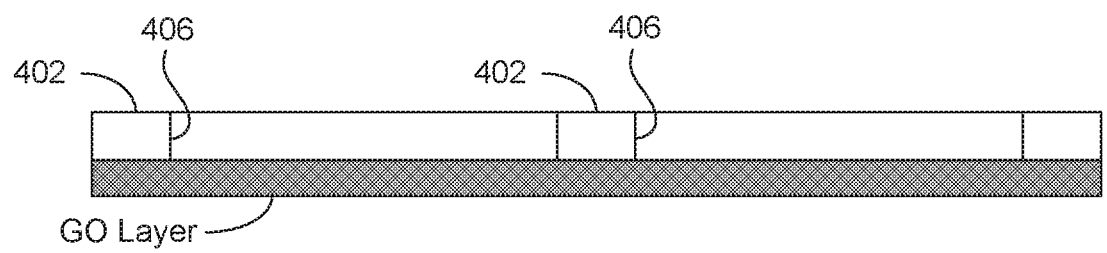
FIG. 4B illustrates a cross-sectional view of the structure of FIG. 4A.

FIG. 4A provides a schematic illustration of a perspective view of the layer 108, in accordance with some embodiments. A supporting structure 402 is provided with a plurality of windows 406 included therein. These windows are sufficiently wide enough to allow the external air to contact the film 303 disposed on the underside of the supporting structure 402. A cross-sectional view of layer 108 at cut 4B is illustrated in FIG. 4B. In this embodiment, the film 303 is relatively thin and supporting structure 402 is provided to prevent the large film 303 from sustaining damage. Although the supporting structure 402 is illustrated on top of or outside of film 303, embodiments are contemplated where the configuration is inverted and supporting structure 402 is placed below or inside of film 303.

Figure 5:
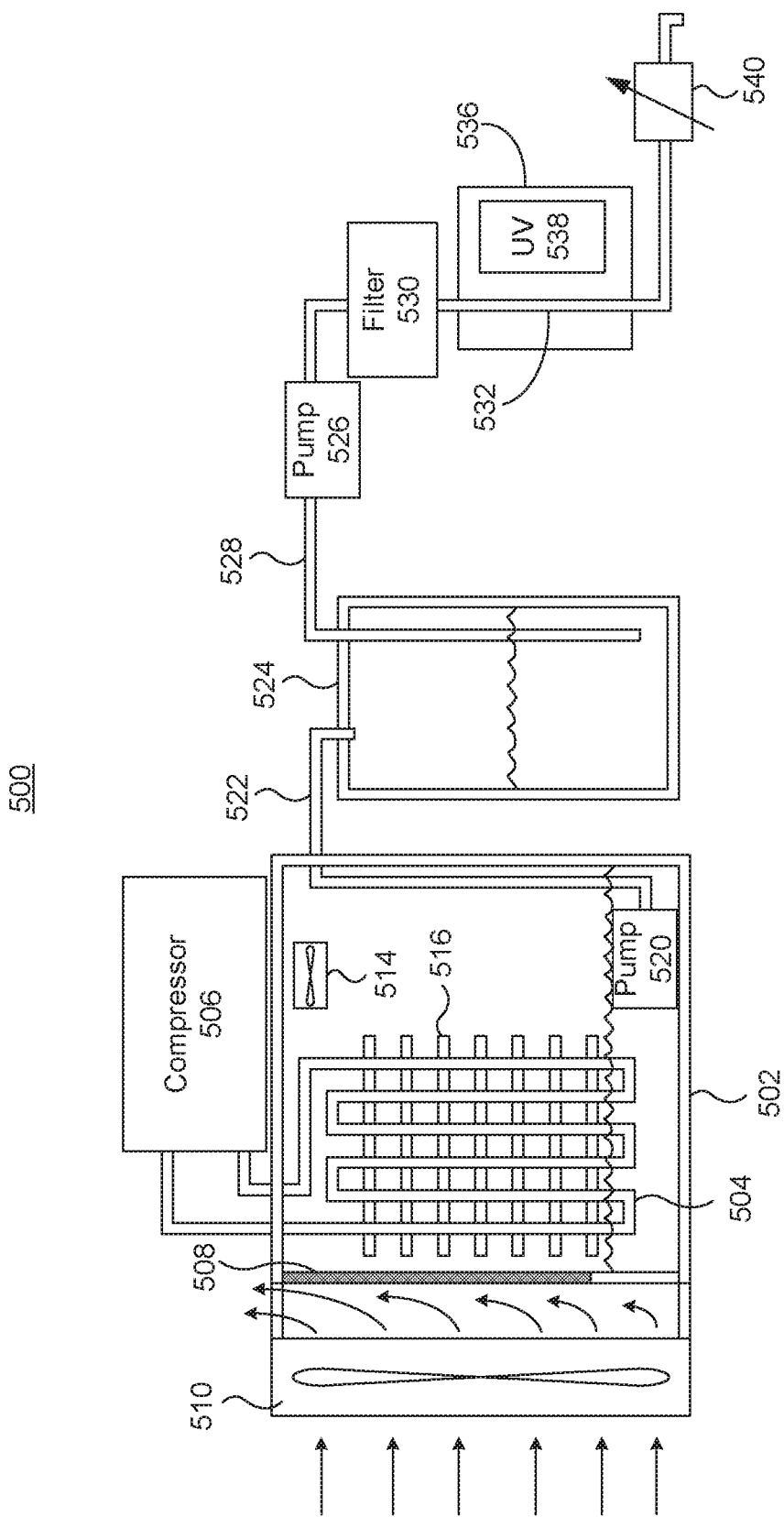
FIG. 5 illustrates a diagrammatic view of a complete AWG system utilizing the graphene oxide layer.

FIG. 5 illustrates a side sectional view of an overall AWG system 500. The system comprises a sealed container 502 that contains a coil system 504 interfaced with a compressor 506 for passing refrigerant through coil system 504. Although not illustrated, there may be various expansion valves and associated with compressor 506 and coil system 504 such that the coil system 504 within the container 502 is driven to a low temperature to extract energy in the form of heat from the internal environment of the container 502. On one side of container 502 there is provided a layer 508 that includes a liquid water permeable region with its outer surface exposed to the environment. A fan 510 may be provided for forcing air over the external surface of the layer 508. Water from the external air is permitted to pass through nano-capillaries in the layer 508 and emerge on the other side of layer 508 in the interior of the sealed container 502. A fan 514 may be provided within the interior space of the sealed contained 502 in order to circulate air therein. This advantageously allows the air to circulate over the interior surface of layer 508 and promote evaporation of water from the interior surface of layer 508. The water is converted from the liquid phase to the vapor phase from the interior surface of the layer 508 in this evaporation process, and this vapor phase water is then condensed upon the coils 504, where a plurality of heat spreading fins 516 are provided for supporting the coils 504 and providing a larger heat transfer surface. Condensed water is permitted to accumulate in the bottom of the sealed container 502. A pump 520 is disposed in the bottom of the sealed container 502 and pumps the water out through a tube 522, which is connected to the top of a reservoir 524 for filling reservoir 524 with condensed water.

In use, water is extracted from the reservoir 524 by a pump 526 through tube 528, and this extracted water may then be passed through a filter 530, such as a HEPA (high-efficiency particulate arrestance) filter to an outlet tube 532 that passes through an enclosure 536 containing an ultraviolet (UV) light 538, which may be used to irradiate the water (the tube 532 being transparent to UV light) in order to sterilize the water as it flows to valve 540. Additional sterilization systems, such as by exposure of water to ozone, are contemplated It will be appreciated that one or more components of system 500 illustrated in FIG. 5 may be absent or in different locations in various embodiments. For example, one or more of pump 520, reservoir 524, pump 526, tube 528, filter 530, enclosure 536, tube 532, UV light 538, and valve 540 may optionally be not present in various embodiments. Alternatively or additionally, the placement of one or more of reservoir 524, pump 526, tube 528, filter 530, enclosure 536, tube 532, UV light 538, and valve 540 may be different. For example, it may be desirable to filter the water using filter 530 after the water is sterilized by UV light 538. Additionally or alternatively, it may be desirable to sterilize and/or filter water pumped from container 502 before it reaches reservoir 524.

Figure 6A:
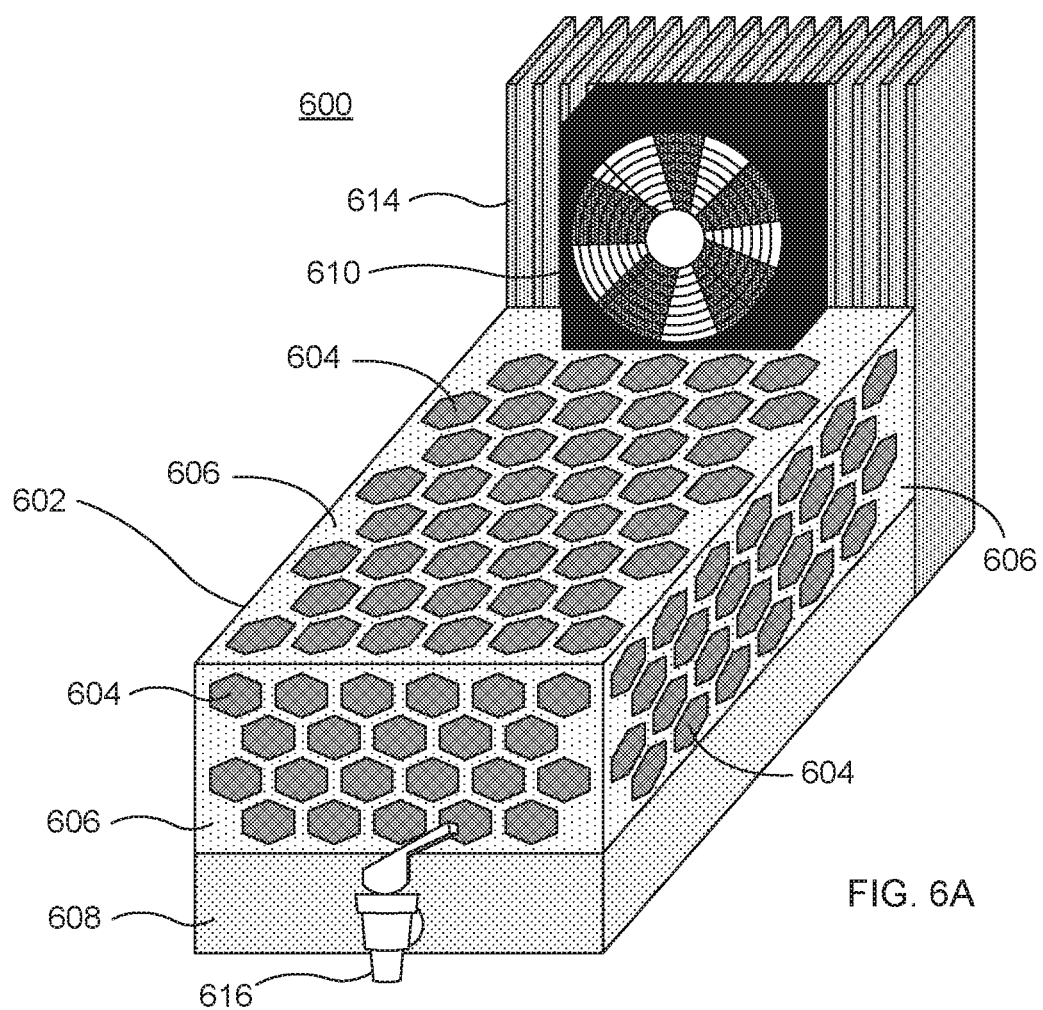
FIG. 6A and FIG. 6B provide schematic illustrations of a countertop AWG system.
Figure 6B:
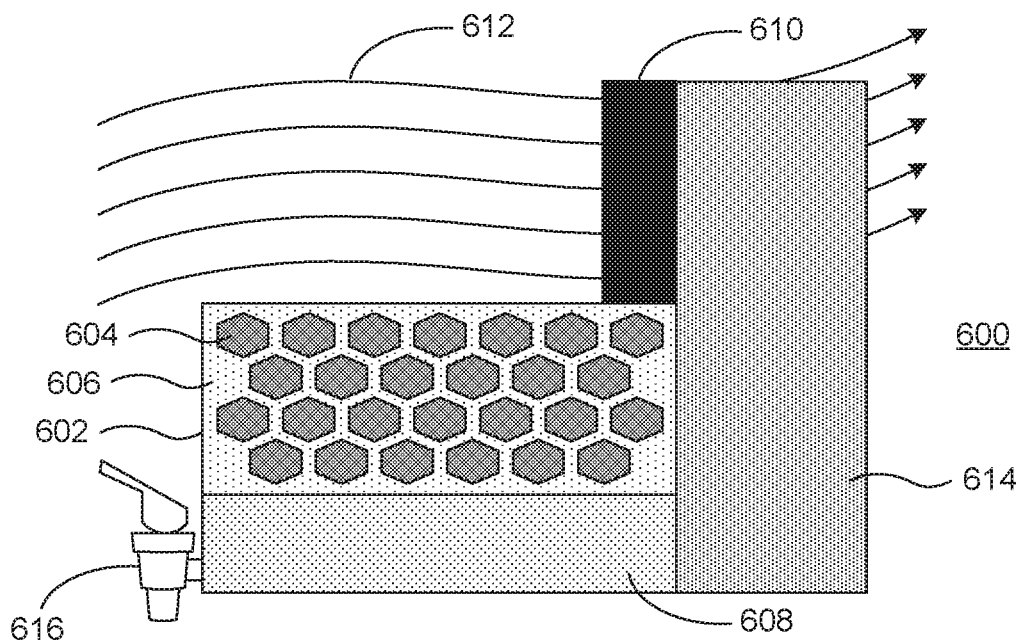

FIG. 6A and FIG. 6B provide schematic illustrations of perspective and side view of a countertop AWG system 600 in accordance with some embodiments. As illustrated, system 600 includes an enclosure 602, constructed as a box including various portions. Enclosure 602 surrounds and defines an internal volume of system 600. Enclosure 602 includes a plurality of liquid water permeable regions 604, which are depicted in FIGS. 6A and 6B as hexagonal openings in support structure 606. Enclosure 602 also includes a reservoir 608 for collecting liquid water that condenses within the internal volume of enclosure 602. It will be appreciated that enclosure 602, including liquid water permeable regions 604, support structure 606, and reservoir 608, forms a sealed enclosure such that atmospheric gases present outside enclosure 602 are prevented from permeating into the internal volume within enclosure 602.

A fan 610 is provided for circulating air 612 over the surface of liquid water permeable regions 604 and for circulating air 612 over fins of heat sink 614. It will be appreciated that circulation of air 612 over the surface of liquid water permeable regions 604 may increase a rate at which water permeates through liquid water permeable regions 604 and into the internal volume of enclosure 602. It will further be appreciated that circulation of air 612 over fins of heat sink 614 may aid in removing energy from within enclosure 602 to allow for efficient condensation of liquid water therein. A valve 616 is further provided on enclosure 602 to allow for extraction of condensed liquid water from within reservoir 608.

Figure 6C:
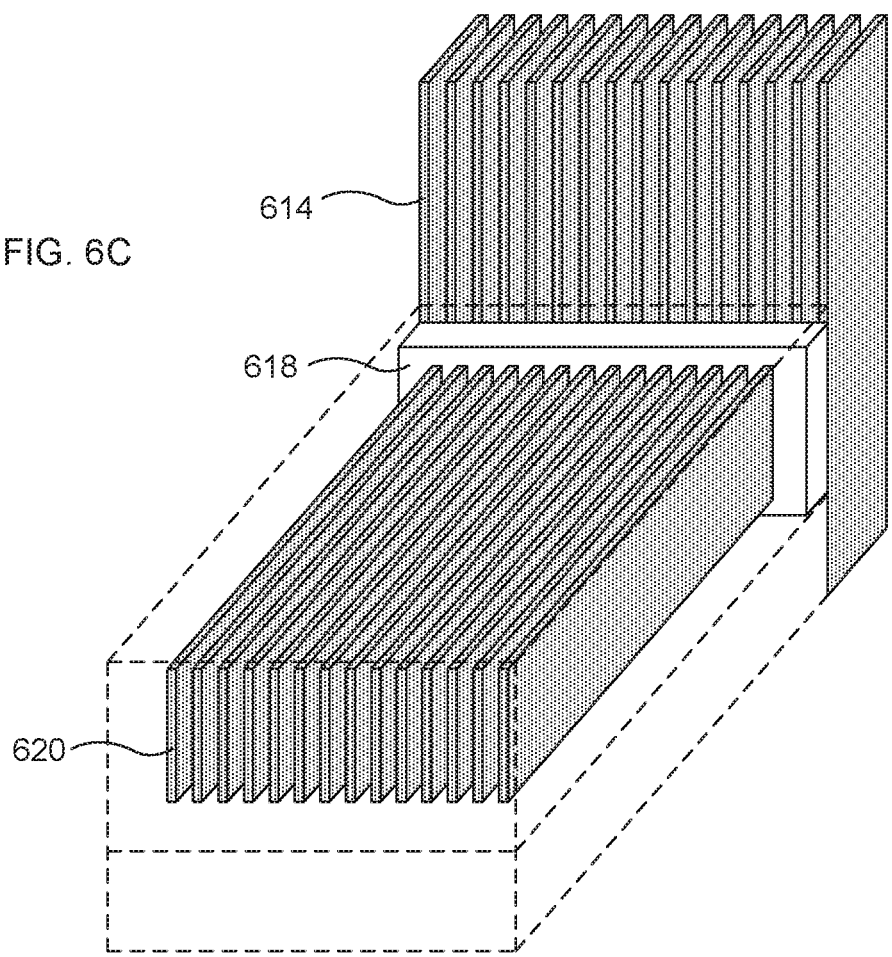
FIG. 6C and FIG. 6D provide schematic illustrations of internal components of the countertop AWG system of FIG. 6A and FIG. 6B.
Figure 6D:
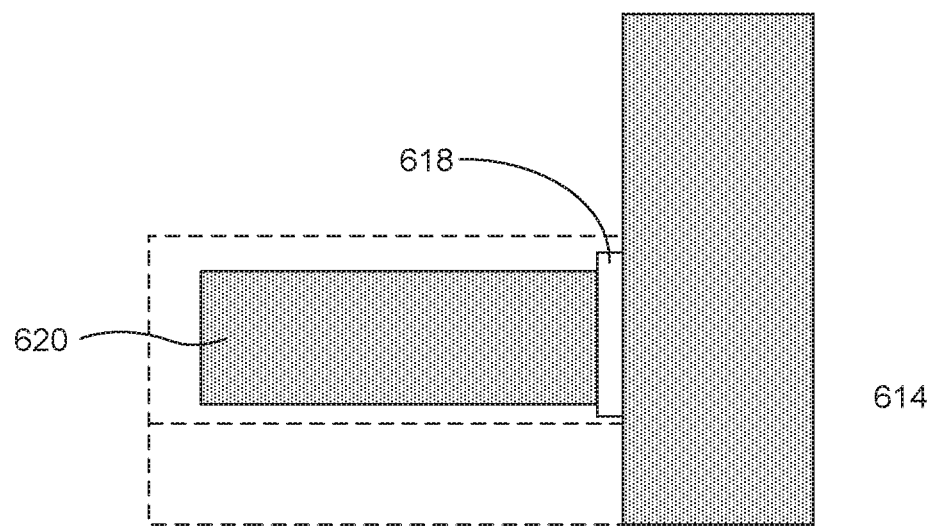

FIG. 6C and FIG. 6D provide schematic illustrations of internal components of the countertop AWG system of FIG. 6A and FIG. 6B. Here, the illustrated internal components include heat pump 618, which may include, for example, a thermoelectric plate or a solid state heat pump. It will be appreciated that other cooling systems may be used in place of heat pump 618, such as a refrigeration system or other heat extraction device. For practical utility as a water generation system, heat pump 618 operates with the fins of heat sink 614 operating as the hot side of heat pump 618 and the fins of heat transfer surface 620 operating as the cold side of heat pump 618. In operation, heat transfer surface 620 absorbs heat from condensing water vapor present within enclosure 602. This heat is pumped by heat pump 618 to heat sink 614, where heat is removed by air 612. Condensed liquid water is permitted to collect in reservoir 608. Although not explicitly illustrated in FIGS. 6C and 6D, heat transfer surface 620 may include one or more coatings, such as a hydrophobic coating, to aid in condensation of water within enclosure 602.

Advantageously, one or more fans (not illustrated) may be present within internal volume of enclosure 602 to aid in transporting water across liquid water permeable regions 604, such as by increasing an evaporation rate from the internal surfaces of liquid water permeable regions 604 as compared to when no fan is operating in the internal volume of enclosure 602. Electric power to fan 610, heat pump 618 and internal fan (if present), may be provided using a variety of electric sources, such as mains power, battery power, solar power, etc. In a particular embodiment, a solar panel may be coupled to system 600 for providing electric power. Such a solar panel may also advantageously be used for shading system 600 from sunlight, which exposure may otherwise reduce the efficiency of operation of system 600.

Figure 7:
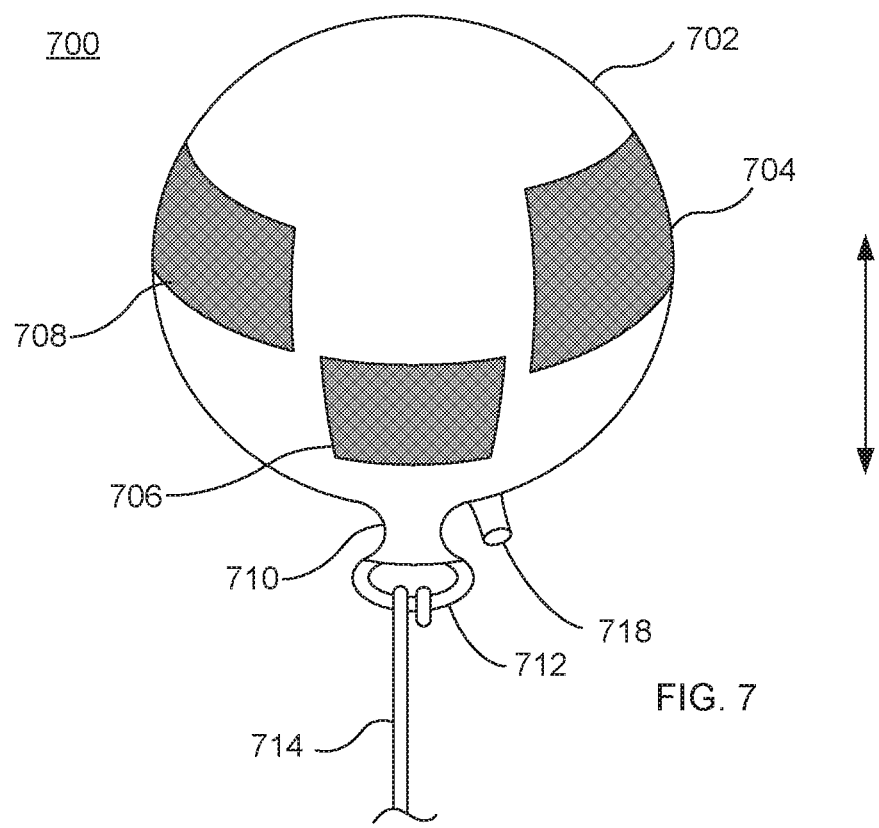
FIG. 7 illustrates a diagrammatic view of one embodiment of a water reclamation balloon.

FIG. 7 provides a schematic illustration of a water reclamation balloon 700. The water reclamation balloon 700 may comprise a non-elastic or elastic material 702, such as metallized Mylar. The water reclamation balloon 700 has liquid water permeable windows 704, 706, and 708 that allow water to enter into the interior of the water reclamation balloon 700 when the partial pressure of water inside the water reclamation balloon 700 is less than the partial pressure of water outside the water reclamation balloon 700. The water reclamation balloon 700 has a sealed mouth 710 coupled to a tether ring 712. A tether 714 is coupled to the tether ring 712 to anchor the water reclamation balloon 700 to the ground and allow the water reclamation balloon 700 to be raised up into the atmosphere and to be lowered to ground level. Additionally, a valve 718 is coupled to the water reclamation balloon 700 the extraction of condensed liquid water.

Figure 8:
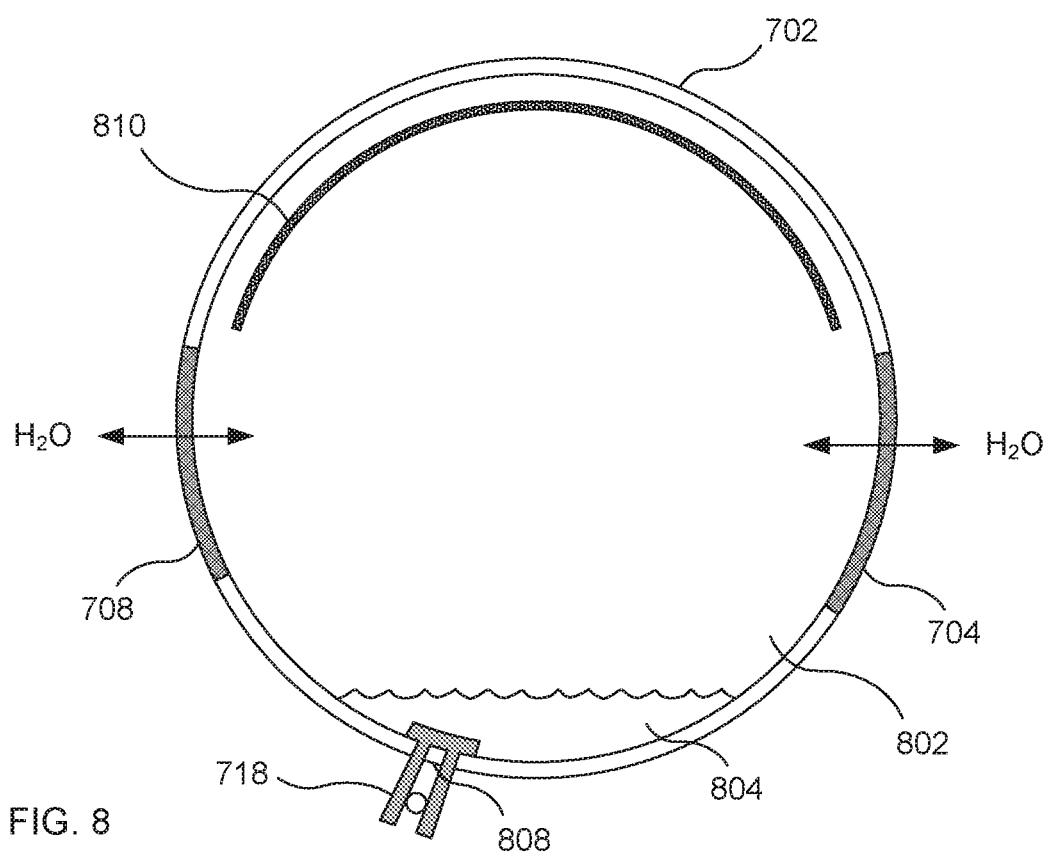
FIG. 8 illustrates a cross-sectional view of the water reclamation balloon of FIG. 7.

FIG. 8 provides a schematic illustration of a cross-sectional view of the ovate reclamation balloon 700. The windows 704 and 708 allow the transfer of water vapor between the interior and exterior of the water reclamation balloon 700. A lifting gas 802 is provided inside the water reclamation balloon 700 for the purpose of lifting the water reclamation balloon 700. Such lifting gas 802 may comprise, for example, a mixture of $H_2$ and $N_2$, He, or other lifting gases. When the water reclamation balloon 700 is disposed at ground level, the interior of the water reclamation balloon 700 equalizes through the windows 704 and 708 with respect to water vapor external to the water reclamation balloon 700. As the water reclamation balloon 700 ascends, the temperature around the water reclamation 700 decreases, due to temperature dependent changes in the atmosphere. Upon exposure to such temperature change, water vapor that is present in the interior of the water reclamation balloon 700 may condense on an interior surface 810 and collect into the bottom of the water reclamation balloon 700 to form a reservoir of liquid water 804. Advantageously, the interior surface 810 of the water reclamation 700 may be hydrophobic, which may aid in water vapor condensing on the interior surface 810. The reservoir liquid water 804 may then be collected from the water reclamation balloon 700 through the valve 718, which may comprise a stopper 808 to allow the valve 718 to be opened and closed. This may be facilitated when the water reclamation balloon 700 is returned to ground level, however. Thus, the operation disposes the water reclamation balloon 700 at ground level, allow the interior to equalize with respect to the water vapor external to the water reclamation balloon 700 at the warmer temperatures associated with the ground level. Since the previous level of water vapor was reduced as a result of condensation at the higher altitude, the partial pressure of water vapor interior to the water reclamation balloon 700 is lower than the external environment at ground level, provided that the water 804 has been removed from the reservoir before it is allowed to come to thermal equilibrium with the atmosphere at ground level. Once the water vapor has equalized, the water reclamation balloon 700 is then raised back to a higher altitude to again condense the water vapor within for storage in the reservoir. Advantageously, the material of the water reclamation balloon 700 seals the lifting gas therein, with the layer liquid water permeable windows 704, 706, 708 preventing transport of the lifting gas out to the external environment. Thus, the only transfer mechanism is for transport of water through windows 704, 706, 708. As described above, this may involve a phase change of water from vapor to liquid on the external surface, passing the liquid water through the nano-capillaries, and then changing back to vapor on the interior surface of the water reclamation balloon 700.

Figure 9A:
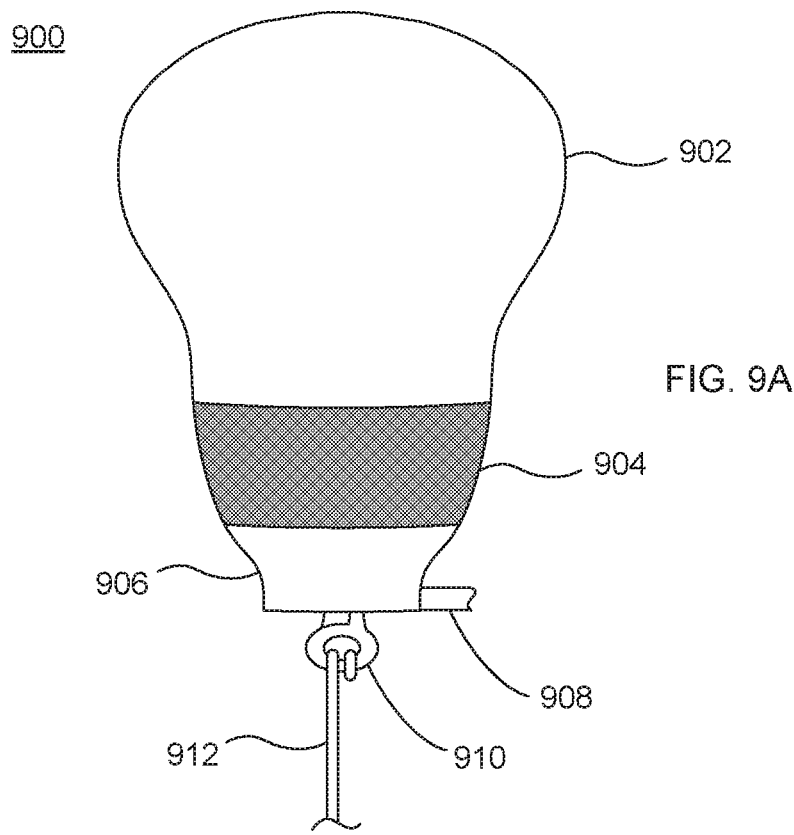
FIG. 9A illustrates a diagrammatic view of another embodiment of a water reclamation balloon.

FIG. 9A provides a schematic illustration of another embodiment of a water reclamation balloon 900. The water reclamation balloon 900 may comprise a non-elastic or elastic lifting bag 902. The water reclamation balloon 900 includes, as a separate section, a liquid water permeable region 904. Below region 904 a reservoir 906 is included for water collection, with a valve 908 coupled for draining water from reservoir 906. At the base of water reclamation balloon 900 a tether ring 910 is coupled, with a tether 912 coupled to the tether ring 910 to tether the water reclamation balloon 900 to the ground, such that the balloon 900 may be raised up to an altitude and pulled back to ground, as will be described below.

Figure 9B:
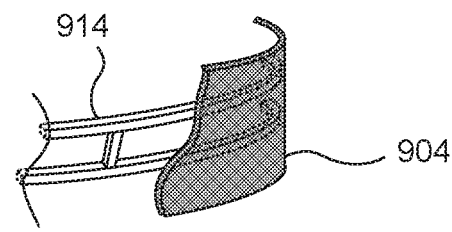
FIG. 9B illustrates a cross-sectional view of a compartment of FIG. 9A.

FIG. 9B illustrates a cross-sectional view of the region 904 of the water reclamation balloon 900. A rib structure 914 may be present inside the balloon 900, adjacent to region 904, for the purpose of providing a surface to apply the region 904, as well as for structural support. In general, the region 904 may be a very thin material that, from a structural standpoint, requires some support in order to cover a large area. The rib structure 914 may provide the interior structural support for the region 904 to provide as much surface area for region 904 as possible to allow the transport of water into the interior of the balloon 900.

Figure 9C:
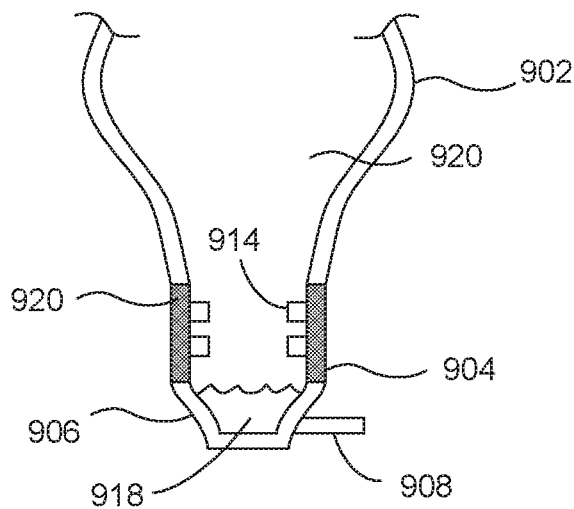
FIG. 9C illustrates a cross-sectional view of the water reclamation balloon of FIG. 9A.

FIG. 9C illustrates a cross-sectional view of the water reclamation balloon 900. The water reclamation balloon 900 comprises lifting bag 902, liquid water permeable region 904 containing the rib structure 914, the reservoir 906, and the valve 908. The lifting bag 902 contains a lifting gas 916, such as a combination of $H_2$ and $N_2$, He, or other lifting gases. Depending upon the weight of the balloon, a mixture of 5% hydrogen and 95% nitrogen may be sufficient for lifting if a substantial amount of surface area is covered with the region 904, though this ratio may be adjusted for weight differences. As the water reclamation balloon 900 rises to, for example, a height of 1000 feet, water vapor present in the interior 920 of the water reclamation balloon 900 condenses on the inside surface of the lifting bag 902, which may be constructed from a material such as Mylar, and then drips down into the reservoir 906 to form a collection of liquid water 918. The latent heat of condensation may advantageously be removed by the lower temperature of the air outside the reclamation balloon 900 when balloon 900 is present at a high altitude. Once the water vapor has condensed into the liquid water 918, the water reclamation balloon 900 may be lowered and the liquid water 918 may then be collected by way of the valve 908.

In operation, the pressure within the interior of the water reclamation balloon 900 at ground level may be approximately one atmosphere. Through capillary action, water vapor will pass through the surface of the region 904 to the interior of the water reclamation balloon 900, while restricting any transfer of the lifting gas from the interior of the water reclamation balloon 900 to the exterior thereof. This may slightly raise the pressure within the interior of the water reclamation balloon 900 but, since this example utilizes a Mylar material that may not be fully inflated, balloon 900 may expand and the pressure within the interior of the water reclamation balloon 900 will be maintained at approximately atmospheric pressure. However, if the entire structure is inelastic, for example, it may be possible to actually cause pressure within the interior of the water reclamation balloon 900 to be slightly less than atmospheric pressure, such as by underinflation with lifting gas or partial evacuation of the balloon 900 to less than atmospheric pressure. In this situation, since the interior pressure is lower than the pressure on the exterior, the partial pressure difference between the interior and exterior may cause the transport of water through nano-capillaries in the region 904 to increase. However, it is possible that, once condensed at the high altitude, the pressure may still be slightly lower such that liquid water 918 will have to be extracted with some type of negative pressure. When extracting liquid water from the reservoir 906, it may be beneficial not to remove lifting gas or to minimize the amount removed to preserve the utility of balloon 900. If some lifting gas is removed due to the negative pressure required to remove liquid water 918, this may further facilitate transport of water vapor into the interior of the water reclamation balloon 900. However, after a number of cycles, the lifting gas may need to be replenished.

Figure 10A:
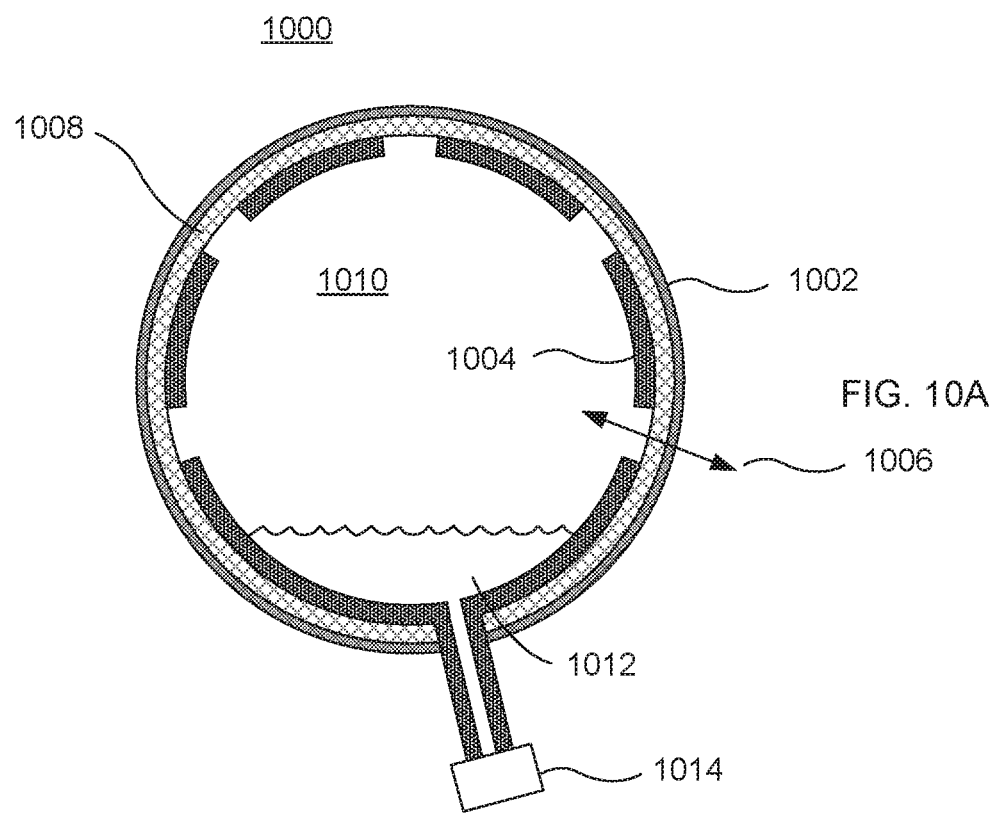
FIG. 10A illustrates a cross-sectional view of yet another embodiment of a water reclamation balloon.

FIG. 10A illustrates a cross-sectional view of another embodiment of a water reclamation balloon 1000. The water reclamation balloon 1000 comprises a liquid water permeable outer layer 1002, which may comprise a mesh structure 1008, a hydrophobic structure 1004, such as a plastic structure, and a valve 1014. The water reclamation balloon 1000 contains a lifting gas 1010, such as $H_2$ and $N_2$, He, or other lifting gases. At ground level, a larger amount of surface area associated with the layer 902 may be provided to facilitate transport of water vapor from the exterior of the water reclamation balloon 1000 to the interior of water reclamation balloon 1000. As the lifting gas raises the altitude of the water reclamation balloon 1000, the water vapor may condense on the hydrophobic structure 1004 and then drip down into the bottom of the water reclamation balloon 1000 to form a reservoir of liquid water 1012. This reservoir of liquid water 1012 may then be collected by way of the valve 1014.

Figure 10B:
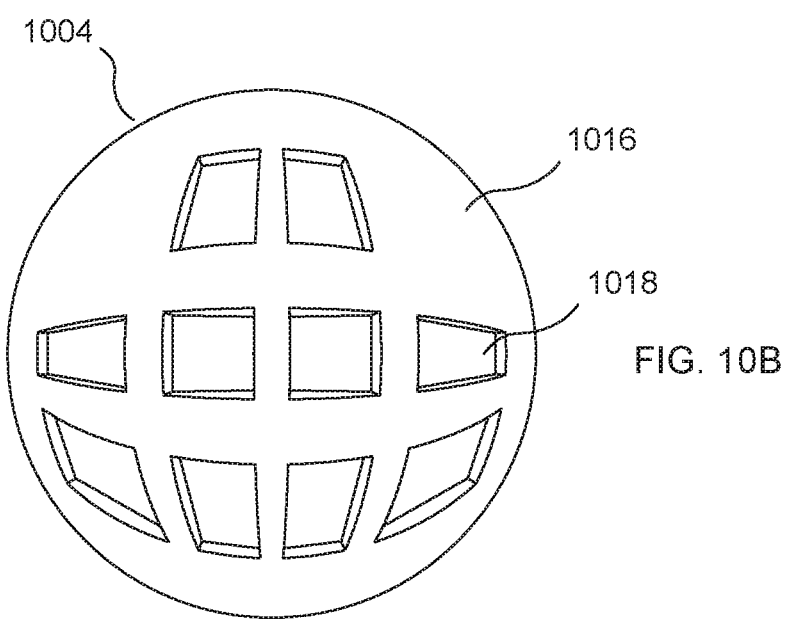
FIG. 10B illustrates a cross-sectional view of components of FIG. 10A.

FIG. 10B illustrates a cross-sectional view of the hydrophobic structure 1004. The hydrophobic structure 1004 comprises a supporting structure 1016 with a plurality of windows 1018 disposed therein. These windows are sufficiently wide enough to allow the external air to contact layer 1002. Since the liquid water permeable material is associated with the coated outer layer 1002, the mesh structure 1008 may be useful for providing sufficient support to maintain the correct volume. However, it is noted that the interior pressure at ground level may be substantially equal to atmospheric pressure. However, as the altitude increases to approximately 1000 feet, the pressure may be reduced exterior to the water reclamation balloon 1000 and, therefore, the layer 902 may need to be sufficiently strong to withstand any pressure difference, since the exterior pressure will be slightly lower than the interior pressure. Further, when the water has condensed, it may be advantageous to consider the weight of the reservoir of liquid water 1012 such that there is no deformation of the structure.

Figure 11:
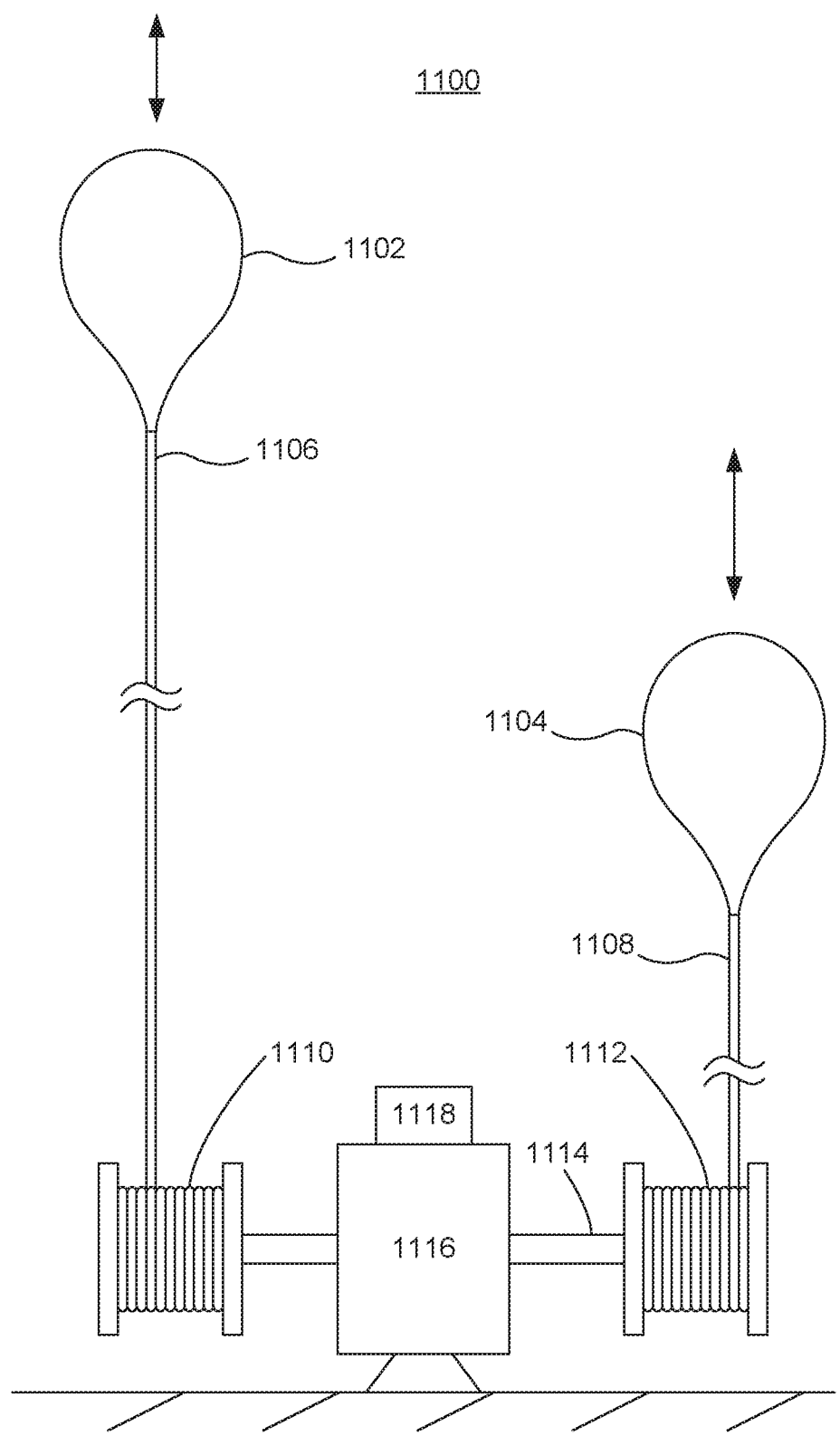
FIG. 11 illustrates a diagrammatic view of one embodiment of a water reclamation balloon winch system.

FIG. 11 illustrates a schematic view of a water reclamation balloon winch or pulley system 1100. The water reclamation balloon winch system 1100 has a first water reclamation balloon 1102 coupled to a first tether 1106, which in turn is coupled to a first winch 1110. A second water reclamation balloon 1104 is coupled to a second tether 1108, which is in turn is coupled to a second winch 1112. The first winch 1110 and the second winch 1112 are coupled to a common axle 1114. The axle 1114 is coupled to a gearbox 1116, which may provide, for example, a 10:1 ratio. The tethers 1106 and 1108 are wound in opposite directions such that upward movement of the balloon 1102 corresponds to downward movement of the balloon 1104. The gearbox 1116 allows the second water reclamation balloon 1104 to extend only 1/10 the height of the first water reclamation balloon 1102, and to act as a counterbalance to the first water reclamation balloon 1102, which requires a lifting force of balloon 1104 to be greater by the gearbox ratio than the lifting force of the balloon 1102 and, thus, it may be advantageous to use a larger balloon. Motor 1018 may be coupled to the gearbox 1116 to facilitate operation of the water reclamation balloon winch system 1100.

In operation, the motor 1118 is operated in a first direction to raise the balloon 1102 up to an altitude by "playing out" the tether 1106 by rotating the axle 1114 in a first direction. This will cause the balloon 1104 to be pulled downward as the tether 1108 is retracted onto winch 1112, since the tether 1108 is wound in the opposite direction on the winch 1112 as compared to the tether 1106 and its direction of wind on the winch 1110. Since the balloon 1104 and the balloon 1102 act as counterweights, the load on the motor 1118 is minimized. When the balloon 1102 is to be retracted from the altitude of condensation back to ground level, the motor 1118 reverses direction to allow the balloon 1104 to extend upward, thus counterbalancing the retraction operation of the tether 1106.

Figure 12A:
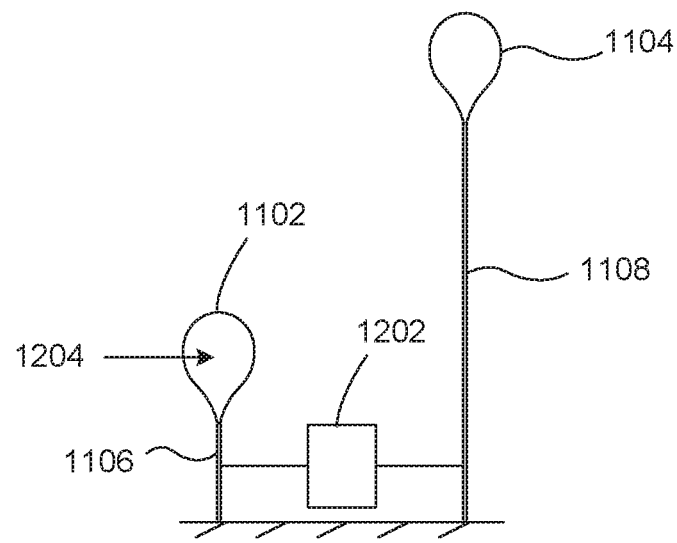
FIG. 12A illustrates a diagrammatic view of the operation of the water reclamation balloon winch system of FIG. 11.

FIG. 12A illustrates a simplified diagrammatic view of the operation of the water reclamation balloon winch system 1100. The water reclamation balloon winch system 1100 comprises the aforementioned first water reclamation balloon 1102, the second water reclamation balloon 1104, the first tether 1106, and the second tether 1108. The water reclamation balloons have an application of a liquid water permeable region according to one or more of the embodiments described herein to allow water vapor 1204 to enter the balloons at ground level and, at a higher altitude with the cooler temperatures, to allow for condensation. A winch system 1202 allows the first water reclamation balloon 1102 and the second water reclamation balloon 1204 to alternate rising and falling operation.

Figure 12B:
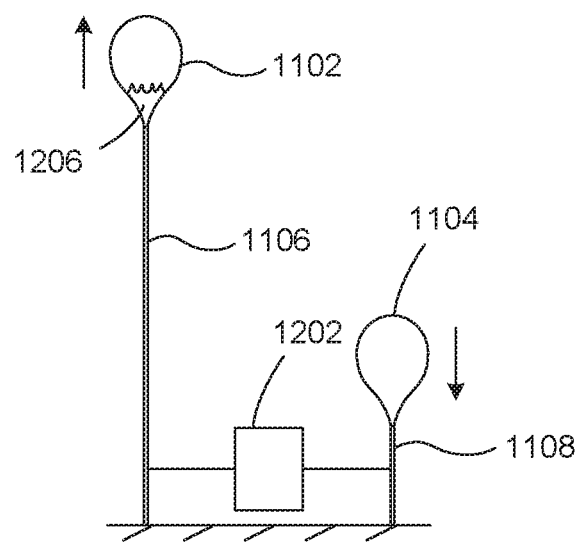
FIG. 12B illustrates further the operation of the water reclamation balloon winch system of FIG. 11.

FIG. 12B illustrates further operation of the water reclamation balloon winch system 1100. As a water reclamation balloon rises, such as the first water reclamation balloon 1102, as depicted in the FIG. 12B, the second water reclamation balloon 1104 lowers. When the water reclamation balloon 1102 is disposed at ground level, vapor pressure of water may equalize between the exterior and the interior of the balloon 1102. As the first water reclamation balloon 1102 rises, water vapor condenses on the interior walls due to decreasing temperatures and liquid water 1206 accumulates in the bottom of the balloon.

Figure 12C:
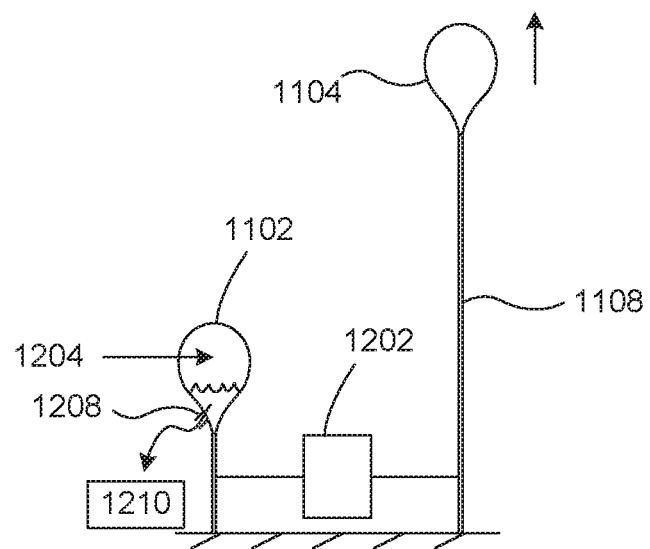
FIG. 12C illustrates still further the operation of the water reclamation balloon winch system of FIG. 11.

FIG. 12C illustrates still further operation of the water reclamation balloon winch system 1100. As the second water reclamation balloon 1104 rises, the first water reclamation balloon 1102 lowers until it reaches ground level. Once the first water reclamation balloon 1102 reaches ground level, the liquid water 1206 may be collected into a reservoir container 1210 by way of a valve 1208. It will be appreciated that these same steps may then occur for the second water reclamation balloon 1104.

Figure 13:
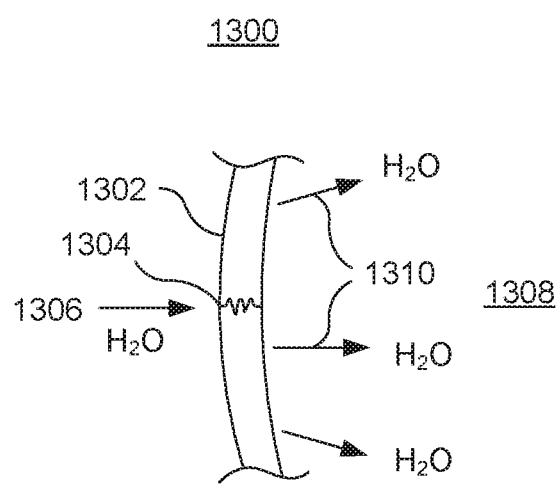
FIG. 13 illustrates a diagrammatic view of one embodiment of graphene oxide coated water reclamation balloon surface.

FIG. 13 illustrates a diagrammatic view of a liquid water permeable layer coated reclamation balloon surface 1300. The water reclamation balloon surface 1300 comprises a liquid water permeable membrane 1302. The membrane 1302 provides nano-capillaries 1304 of the sort described above that allow the transport of water 1306, but do not allow the transport of lifting gas 1308 out of the balloon or external atmospheric gases into the balloon. Water 1306 transportation may substantially unimpeded through these nano-capillaries, as if the membrane 1302 was not present. As such, water 1306 is transported through the nano-capillaries in the membrane 1302 from the exterior of the water reclamation balloon surface 1300, to increase the water vapor pressure 1310 of the balloon interior.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting.

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein. It will be appreciated that individual embodiments described herein may be combined to form additional embodiments or implementations in any combination or subcombination.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A system for atmospheric water reclamation, comprising:
    an enclosure defining an internal volume, wherein the enclosure prevents gases from permeating into or out of the internal volume, wherein at least a portion of the enclosure is a liquid water permeable region that allows water molecules to permeate into or out of the internal volume, and wherein the liquid water permeable region comprises:
        an interlocking layer structure including a system of nano-capillaries, wherein liquid water is permitted to pass from a first surface of the interlocking layer structure to a second surface of the interlocking layer structure through the system of nano-capillaries, and wherein gases are incapable of passing through the system of nano-capillaries;
    a heat transfer surface positioned within the internal volume, wherein the heat transfer surface is configured to remove heat from within the internal volume such that water vapor present within the internal volume condenses on the heat transfer surface to form condensed liquid water;
    a reservoir positioned within the internal volume to collect the condensed liquid water; and
    a fan or blower for directing air from an atmosphere external to the enclosure towards the liquid water permeable region, or a fan or blower within the internal volume for circulating gases within the internal volume over an internal surface of the liquid water permeable region or over the heat transfer surface.

2. The system of claim 1, wherein the liquid water permeable region allows water molecules to permeate into the internal volume by water molecules, in vapor form present in an atmosphere external to the enclosure, condensing on the first surface of the interlocking layer structure and changing to liquid form, passing as a liquid through the system of nano-capillaries, and evaporating from the second surface of the interlocking layer structure to increase a partial pressure of water within the internal volume.

3. The system of claim 1, wherein the liquid water permeable region comprises a graphene oxide film.

4. The system of claim 1, wherein the interlocking layer structure comprises a graphene oxide laminate including a plurality of graphene oxide crystallites.

5. The system of claim 1, wherein the liquid water permeable region comprises a thin film having a thickness between 0.1 μm and 5 μm.

6. The system of claim 1, wherein nano-capillaries of the system of nano-capillaries have a dimension selected between 5 Å and 15 Å.

7. The system of claim 1, wherein the heat transfer surface comprises a condensing surface that has a temperature below ambient temperature.

8. The system of claim 1, wherein the heat transfer surface comprises a surface of a heat exchanger that is positioned in thermal communication with a heat pump or refrigeration system.

9. The system of claim 1, wherein the enclosure exhibits a gas permeation rate less than or equal to $10^{-8}$ mm g/cm$^2$ s bar.

10. The system of claim 1, further comprising a support structure attached to the enclosure for supporting the liquid water permeable region.

11. A method for atmospheric water reclamation, comprising:
    providing an enclosure surrounding an internal volume, wherein the enclosure prevents gases from permeating into or out of the internal volume, wherein at least a portion of the enclosure is a liquid water permeable region that allows water molecules to permeate into or out of the internal volume, and wherein the liquid water permeable region comprises:
        an interlocking layer structure including a system of nano-capillaries, wherein liquid water is permitted to pass from a first surface of the interlocking layer structure to a second surface of the interlocking layer structure through the system of nano-capillaries, and wherein gases are incapable of passing through the system of nano-capillaries;
    cooling a heat transfer surface positioned within the internal volume to remove heat from gases within the internal volume such that water vapor present in the gases within the internal volume condenses on the heat transfer surface to form condensed liquid water;
    collecting the condensed liquid water in a reservoir within the internal volume; and
    directing air from an atmosphere external to the enclosure towards the liquid water permeable region using a fan or blower external to the enclosure or circulating gases within the internal volume over an internal surface of the liquid water permeable region or over the heat transfer surface using a fan or blower within the internal volume.

12. The method of claim 11, wherein the liquid water permeable region comprises a graphene oxide film or a graphene oxide laminate including a plurality of graphene oxide crystallites.

13. The method of claim 11, wherein the liquid water permeable region is formed by steps including:
    dispersing graphite oxide in water by sonication to form a stable suspension of graphene oxide crystallites;
    spray-coating or spin-coating the stable suspension of graphene oxide crystallites over a supporting film; and
    removing at least a portion of the supporting film, thereby generating the liquid water permeable region.

14. A method comprising:
    providing an enclosure for surrounding an internal volume;
    creating a liquid water permeable region within a wall of the enclosure, wherein the liquid water permeable region allows water molecules to permeate into or out of the internal volume, wherein the enclosure and the liquid water permeable region together prevents gas molecules and gas atoms from permeating into or out of the internal volume, and wherein the liquid water permeable region comprises:
        an interlocking layer structure including a system of nano-capillaries, wherein liquid water is permitted to pass from a first surface of the interlocking layer structure to a second surface of the interlocking layer structure through the system of nano-capillaries, and wherein gases are incapable of passing through the system of nano-capillaries; and
    positioning a fan or blower for directing air from an atmosphere external to the enclosure towards the liquid water permeable region or positioning a fan or blower within the internal volume for circulating gases within the internal volume over an internal surface of the liquid water permeable region.

15. The method of claim 14, wherein creating the liquid water permeable region includes forming a graphene oxide film by:
    dispersing graphite oxide in water by sonication to form a stable suspension of graphene oxide crystallites;
    spray-coating or spin-coating the stable suspension of graphene oxide crystallites over a supporting film; and
    removing at least a portion of the supporting film.

16. The method of claim 14, wherein the liquid water permeable region comprises a graphene oxide film or a graphene oxide laminate including a plurality of graphene oxide crystallites.

17. The method of claim 14, wherein the liquid water permeable region comprises a thin film having a thickness between 0.1 μm and 5 μm or wherein nano-capillaries of the system of nano-capillaries have a dimension selected between 5 Å and 15 Å.

18. The method of claim 11, wherein the liquid water permeable region comprises a thin film having a thickness between 0.1 μm and 5 μm or wherein nano-capillaries of the system of nano-capillaries have a dimension selected between 5 Å and 15 Å.

19. The system of claim 1, wherein the liquid water permeable region exhibits a gas permeation rate less than or equal to $10^{-8}$ mm·g/cm$^2$·s·bar or wherein the liquid water permeable region exhibits a water permeation rate greater than or equal to $10^{-5}$ mm·g/cm$^2$·s·bar.

20. The system of claim 1, wherein the heat transfer surface comprises a surface of the enclosure.

* * * * *